United States Patent
Arsenault et al.

(10) Patent No.: US 6,870,546 B1
(45) Date of Patent: Mar. 22, 2005

(54) PROTECTABLE EXPRESSIONS IN OBJECTS HAVING AUTHORABLE BEHAVIORS AND APPEARANCES

(75) Inventors: David Wayne Arsenault, Ithaca, NY (US); William James Dhimitri, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 435 days.

(21) Appl. No.: 09/662,411

(22) Filed: Sep. 14, 2000

Related U.S. Application Data (63) Continuation-in-part of application No. 09/450,207, filed on Nov. 29, 1999, which is a continuation of application No. 09/169,599, filed on Oct. 9, 1998, now Pat. No. 6,025,849, which is a continuation-in-part of application No. 09/092,383, filed on Jun. 5, 1998, now Pat. No. 6,064,386, and a continuation-in-part of application No. 09/088,116, filed on Jun. 1, 1998, now Pat. No. 6,232,983, application No. 09/662,441, which is a continuation-in-part of application No. 09/488,308, filed on Jan. 20, 2000, which is a continuation of application No. 09/092,383, filed on Jun. 5, 1998, now Pat. No. 6,064,386.

(51) Int. Cl.$^7$ ............................. G09G 5/00; G06E 7/00
(52) U.S. Cl. ............................. 345/619; 707/9; 707/103
(58) Field of Search ........................ 707/10, 9, 103 R, 707/103 Y, 103; 713/200, 201; 345/619

(56) References Cited

U.S. PATENT DOCUMENTS

| | | | |
|---|---|---|---|
| 4,521,321 A | * | 6/1985 | Anderson et al. ............... 707/8 |
| 4,621,321 A | * | 11/1986 | Boebert et al. ................. 707/8 |
| 5,133,024 A | * | 7/1992 | Froessl ........................ 382/282 |
| 5,177,789 A | * | 1/1993 | Covert ........................ 713/184 |
| 5,444,836 A | | 8/1995 | Hollingsworth et al. |
| 5,490,241 A | | 2/1996 | Mallgren et al. |
| 5,513,309 A | | 4/1996 | Meier et al. |
| 5,564,004 A | | 10/1996 | Grossman et al. |
| 5,581,670 A | | 12/1996 | Bier et al. |
| 5,619,571 A | * | 4/1997 | Sandstrom et al. ......... 380/200 |
| 5,627,949 A | | 5/1997 | Letcher, Jr. |
| 5,633,955 A | | 5/1997 | Bozinovic et al. |
| 5,675,782 A | | 10/1997 | Montague et al. |
| 5,704,028 A | | 12/1997 | Schanel et al. |

(List continued on next page.)

FOREIGN PATENT DOCUMENTS

| | | | | |
|---|---|---|---|---|
| JP | 08115342 A | * | 5/1996 | ........... G06F/17/50 |

*Primary Examiner*—Matthew C. Bella
*Assistant Examiner*—Anthony Blackman
(74) *Attorney, Agent, or Firm*—Gates & Cooper LLP

(57) ABSTRACT

A method, apparatus, and article of manufacture for executing intelligent shape programming in a computer within a CAD application program, wherein elements of the intelligent shape can be protected from unauthorized use and modification. The intelligent shape comprises several objects for use in connecting, manipulating, displaying, mapping, protecting, and otherwise creating a new component or modifying an existing one. To provide for the protection of a shape, the intelligent shape programming provides for the user of a protection object that comprises a read-write shape identification and a set password method. The set password method is utilized to assign a password to each shape that is combined with the shape identification such that the shape becomes password protected. Once password protected, properties and expressions of the shape cannot be modified, changed, deleted, etc. and the protection status of the shape cannot be changed. To provide for the protection of individual properties and expressions of a shape, a boolean protection property for each property/expression of a shape is maintained in an expressions object. When the protection property is set to TRUE (and the shape is password protected), the expression/property cannot be changed, modified, accessed, deleted, assigned, etc. Accordingly, an author supplied password is utilized to prevent unauthorized access and protect the author's investment in creating and defining the shape.

53 Claims, 6 Drawing Sheets

U.S. PATENT DOCUMENTS

| | | | |
|---|---|---|---|
| 5,715,487 A | * 2/1998 | McIntyre et al. | 396/299 |
| 5,760,774 A | 6/1998 | Grossman et al. | |
| 5,761,669 A | 6/1998 | Montague et al. | |
| 5,818,457 A | 10/1998 | Murata et al. | |
| 5,856,828 A | 1/1999 | Letcher, Jr. | |
| 5,864,683 A | * 1/1999 | Boebert et al. | 709/249 |
| 5,894,310 A | 4/1999 | Arsenault et al. | |
| 5,900,874 A | 5/1999 | Shrader et al. | |
| 5,944,823 A | * 8/1999 | Jade et al. | 713/201 |
| 5,977,997 A | * 11/1999 | Vainsencher | 345/519 |
| 5,978,476 A | * 11/1999 | Redman et al. | 345/468 |
| 5,990,900 A | 11/1999 | Seago | |
| 6,006,328 A | * 12/1999 | Drake | 713/200 |
| 6,009,523 A | * 12/1999 | Owaki et al. | 713/200 |
| 6,047,078 A | 4/2000 | Kang | |
| 6,051,028 A | 4/2000 | McCartney et al. | |
| 6,169,993 B1 | * 1/2001 | Shutt et al. | 707/103 R |
| 6,192,455 B1 | * 2/2001 | Bogin et al. | 345/520 |
| 6,256,635 B1 | * 7/2001 | Arrouye et al. | 707/102 |
| 6,292,798 B1 | * 9/2001 | Dockter et al. | 707/9 |
| 6,308,173 B1 | * 10/2001 | Glasser et al. | 707/9 |
| 6,480,856 B1 | * 11/2002 | McDonald et al. | 707/100 |

* cited by examiner

PROTECTABLE EXPRESSIONS IN OBJECTS HAVING AUTHORABLE BEHAVIORS AND APPEARANCES

CROSS REFERENCE TO RELATED APPLICATIONS

U.S. patent application Ser. No. 09/450,207, entitled "FRAMEWORK FOR OBJECTS HAVING AUTHORABLE BEHAVIORS AND APPEARANCES," by Lawrence D. Felser et al., filed on Nov. 29, 1999, now U.S. Pat. No. 6,462,751, issued Oct. 8, 2002, which is a continuation of U.S. patent application Ser. No. 09/169,599, entitled "FRAMEWORK FOR OBJECTS HAVING AUTHORABLE BEHAVIORS AND APPEARANCES," by Lawrence D. Felser et al, filed on Oct. 9, 1998, now U.S. Pat. No. 6,025,849, issued Feb. 15, 2000, which is a continuation-in-part of U.S. patent application Ser. No. 09/092,383, entitled "SHAPE OBJECTS WITH AUTHORABLE BEHAVIORS AND APPEARANCES," by Lawrence D. Felser, et al., filed on Jun. 5, 1998, now U.S. Pat. No. 6,064,386, issued May 16, 2000, and a continuation-in-part of U.S. patent application Ser. No. 09/088,116, entitled "POSITIONING AND ALIGNMENT AIDS FOR SHAPE OBJECTS WITH AUTHORABLE BEHAVIORS AND APPEARANCES," by Lawrence D. Felser, et al., filed on Jun. 1, 1998, now U.S. Pat. No. 6,232,983, issued May and 15, 2001; and U.S. patent application Ser. No. 09/488,308, entitled "SHAPE OBJECTS HAVING AUTHORABLE BEHAVIORS AND APPEARANCES," by Lawrence D. Felser et al., filed on Jan. 20, 2000, now U.S. Pat. No. 6,219,056, issued Apr. 17, 2001, which is a continuation of U.S. patent application Ser. No. 09/092,383, entitled "SHAPE OBJECTS HAVING AUTHORABLE BEHAVIORS AND APPEARANCES," by Lawrence D. Felser et al., filed on Jun. 5, 1998, now U.S. Pat. No. 6,064,386, issued on May 16, 2000, all of which applications are incorporated by reference herein.

BACKGROUND OF THE INVENTION

1. Field of the Invention

The present invention relates generally to protecting access to proprietary elements of an object, and in particular, to a method, apparatus, and article of manufacture for providing a mechanism that prevents unauthorized persons from reverse-engineering the programming logic used to create objects (including shape objects) with authorable behaviors and appearances for computer programs.

2. Description of the Related Art

The use of Computer Assisted Drafting (CAD) application programs is well known in the art. Some CAD programs provide templates and palettes that help users create documents, graphical presentations, etc. These templates and palettes provide only limited assistance and do little to help the user connect standard CAD components, define new components, or define methods of manipulating the components within the CAD program.

Most standard components are predefined by the CAD program itself, leaving little room for the user to define custom shapes without using the predefined standard components as building blocks. A user must manipulate standard components to define a shape or outline, place them spatially proximate on a working screen, and then group them together using a grouping or wrapping function.

Since defining custom shapes may be difficult and consume significant time, shape authors such as companies and individuals may define custom shapes and provide or sell them to users of the system. However, once the custom authored shapes have been distributed, the elements that comprise a custom shape (e.g., objects, properties, attributes, and expressions) may be freely accessed, distributed, and modified. Thus, unauthorized users may perform unwanted changes in an authored shape by accessing the shape's elements. Further, a shape's elements may be utilized to create unauthorized new or derived custom authored shapes. Accordingly, there is no mechanism for a shape author to protect the author's investment in creating and defining the custom shape.

Similarly, an author may invest considerable effort, time, and money in creating any type of custom object. However, once the custom object has been distributed, the elements that comprise the custom object (e.g., objects, properties, attributes, and expressions) may be freely accessed, distributed, and modified. The prior art does not provide a mechanism for an object author to protect the author's investment in creating and defining the custom object.

Consequently, there is a need in the art for improved techniques for defining custom objects and shapes in a computer program (e.g., a CAD program) while maintaining the ability to protect the elements of the custom object or shape.

SUMMARY OF THE INVENTION

To address the requirements described above, the present invention discloses a method, apparatus, and article of manufacture for executing intelligent object programming in a computer within an application program, wherein the intelligent object can be authored by a user and wherein the elements of the intelligent object can be protected from unauthorized use and modification. In one or more embodiments, an intelligent object or shape comprises several objects for use in connecting, manipulating, displaying, mapping, protecting, and otherwise creating a new component or modifying an existing one.

To provide for the protection of an object or shape, the intelligent object programming also comprises a hidden read-only property that returns an object's protection object. The protection object comprises a read-write object identification and a set password method. The set password method is utilized to assign a password to each object that is combined with the object identification such that the object becomes password protected. Once password protected, properties and expressions of the object cannot be modified, changed, deleted, etc. and the protection status of the object cannot be changed.

To provide for the protection of individual properties and expressions of an object, a boolean protection property for each property/expression of an object is maintained in an expressions object. When the protection property is set to TRUE (and the object is password protected), the expression/property cannot be changed, modified, accessed, deleted, assigned, etc. Accordingly, an author supplied password is utilized to prevent unauthorized access and protect the author's investment in creating and defining the object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer program such as a computer-aided design (CAD) program that provides intelligent objects, wherein the intelligent objects can be authored by a user. The intelligent object provides a mechanism that prevents unauthorized users from reverse-engineering the programming logic that an author has incorporated into an object.

Hardware Environment

Figure 1:
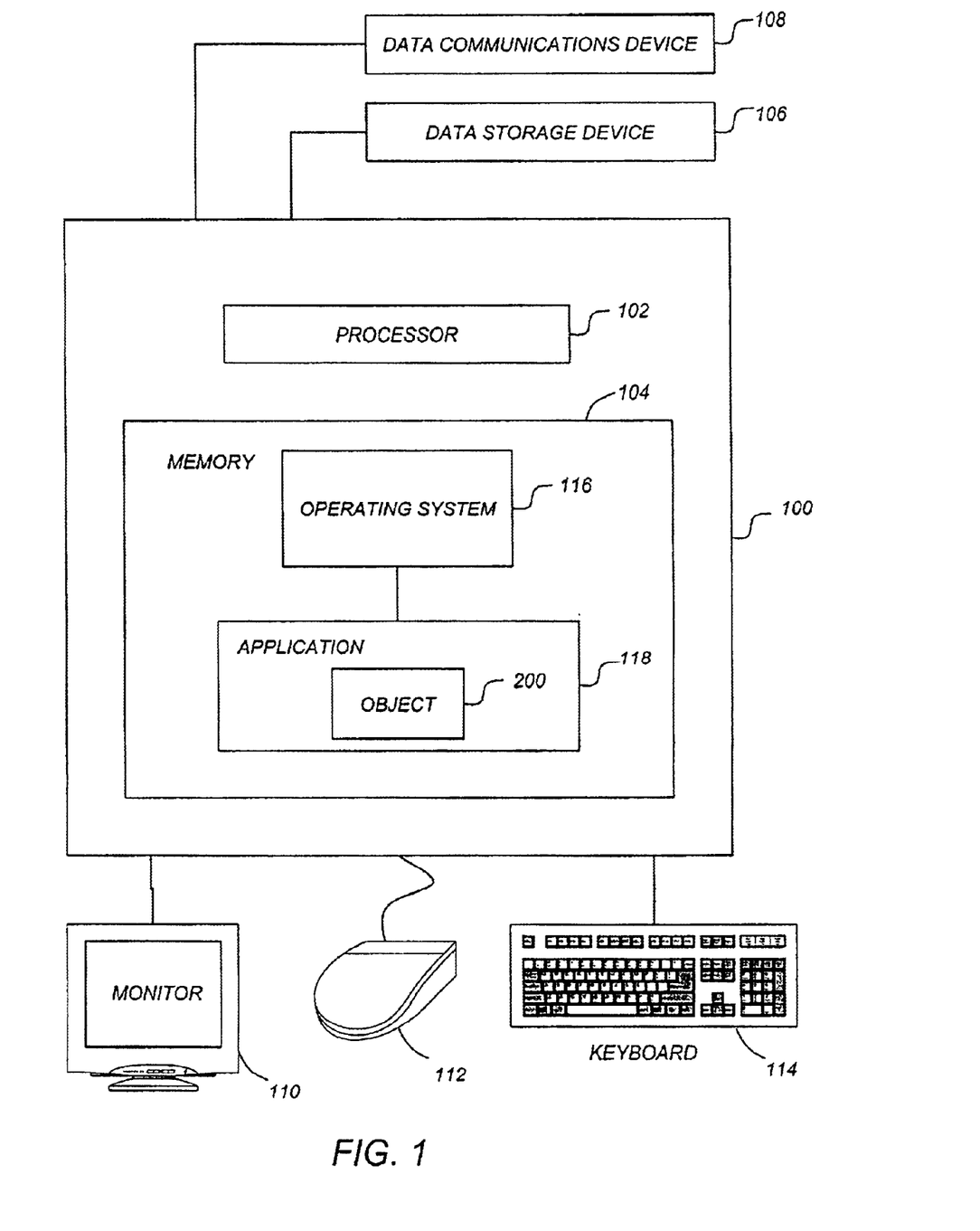
FIG. 1 is an exemplary hardware environment used to implement the preferred embodiment of the invention.

FIG. 1 is an exemplary hardware environment used to implement one or more embodiments of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In one or more embodiments of the invention, the application program 118 provides one or more intelligent objects 200.

Generally, the application program 118 and intelligent objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, system, data structure, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Intelligent Shape Objects

Figure 2:
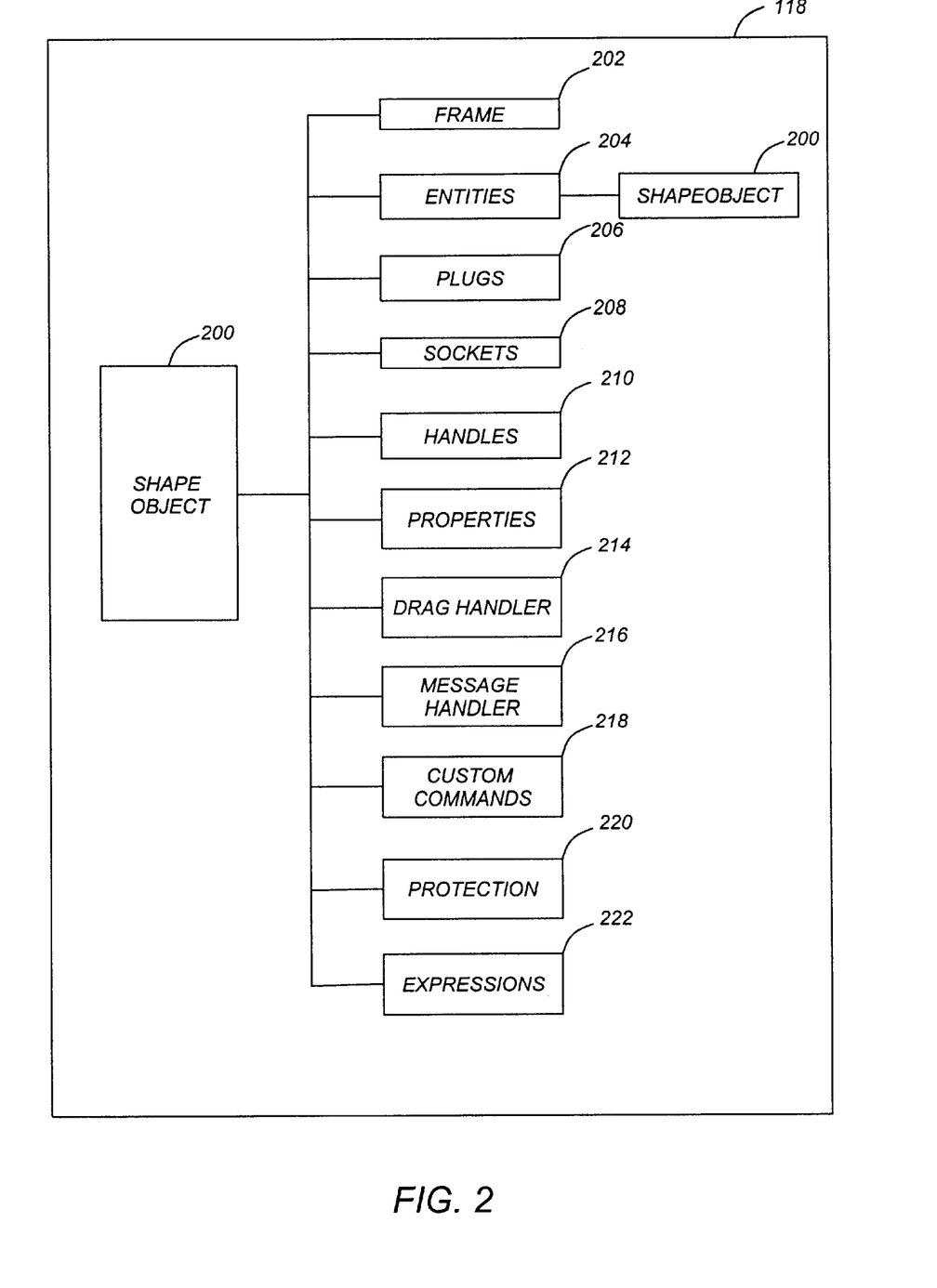
FIG. 2 illustrates the components of a shape object of the present invention.

FIG. 2 is a block diagram that illustrates the components of an intelligent object in accordance with one or more embodiments of the invention. In FIG. 2, the intelligent object 200 is an intelligent shape object 200 that is comprised of the following different elements: (1) a spatial frame 202 that provides the underlying structure and spatial mapping for the intelligent shape object 200; (2) an entities collection 204 that includes zero or more objects of geometry along with zero or more other (subordinate) shape objects 200 that together make up the (superordinate) shape object 200; (3) zero or more plugs 206 and sockets 208 that provide connectivity to other shape objects 200; (4) zero or more handles 210 that provide direct manipulation of the shape object 200, thereby allowing the user to stretch or otherwise resize the shape object 200; (5) a properties collection 212 that contains additional authorable properties of the shape object 200, e.g., extended properties defined by authors of the shape object 200; (6) a drag handler 214 that defines the behavior of the shape object 200 while the shape object 200 is being dragged; (7) a message handler 216 that defines the behavior of the shape object 200 when the shape object 200 receives system level commands or inputs; (8) a custom command collection 218 that allows the author to define extended commands for the shape object 200; (9) a protection object 220 that provides the ability set and clear a password for other objects and properties 202–218; and (10) an expressions object that manages properties 212 of an object. The frame 202, the entities 204, the plugs 206, the sockets 208, the handles 210, the properties 212, the drag handler 214, the message handler 216, the custom commands 218, the protection object 220, and the expressions object 222 may be imbued with data and logic that add intelligence to the shape object 200, in order to provide added convenience to the user.

Generally, an object 200 (e.g., a shape object) is authored (also called created) by specifying the values of the properties of the objects comprising the object 200. A property value can be an object, which gives objects 200 nesting capabilities. Additionally, each property can have and be defined by an "expression" which is written in a programming language. For example, the "Flex" programming language, an internal programming language provided by Autodesk®, the assignee of the present invention, may be utilized to define a property.

This aspect of adding new objects or replacing existing objects within an object 200 is part of the authoring process. Authoring is an activity that is external to the object 200; the object 200 source code, along with the source code for the objects within the object 200, are not affected by the authoring process. This bifurcation of the authoring activity from the object 200 allows the object to be authored statically or at runtime. The object 200 is then persistent until modified. However, only those properties of an object that are defined by an expression can persist. Object properties that are not defined by an expression can persist.

Objects 200 can be uniquely named, and can also generate events that reflect changes from the objects contained within object 200. External software can subscribe to these events, ensuring that the external software is notified of any changes to the object 200.

Example Shape Object

As an example, consider an object 200 (e.g., a shape object 200) that describes a chair. Such an object 200 has a geometry, which describes the paths used to render the appearance of the chair on a page. The object 200 may be composed of geometry that describes the chair's support members, with sub-shapes making up the seat, back, arms and other elements (and each of those shapes have their own properties, geometry, and so on). This geometry is defined as the frame 202 of the object 200.

The chair may be modular, taking optional wheels, arms, and levers, each of which connects to the object 200. These connection points are defined via plugs 206 and sockets 208. The chair may come in two or three sizes, any of which may be invoked by dragging handles. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, plugs 206, sockets 208, handles 210, and properties 212 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the object 200 (e.g., a shape object) to a particular space, notably the document page coordinate space. The frame 202 is a property of the object 200, and as such is under the control of the author of the object 200, e.g., the Visual Basic for Applications (VBA) programmer, and anyone else with access to the object properties.

The frame 202 of an object 200 exposes a geometric framework to which the elements of the object 200 can be attached via expressions. The frame 202 also serves as a superstructure that relates all the other objects, some of which may be non-geometric, within the object 200. In addition, the frame 202 characterizes the spatial aspect of the object 200 as a whole, to allow the interpretation of methods such as Move, Rotate and Mirror. Finally, the frame 202 provides the mapping, if any, between the inside of the object 200 and the outside of the object 200.

The frame 202 is a description of a coordinate space that maps the local (inside the object 200) space to a parent (outside the object 200) space. For example, a straight line internal to a polar frame becomes an arc outside the frame. The frame 202 can encompass one, two, or three dimensional spaces.

Several types of frames 202 can be envisioned: line frames, rectangular frames, scaling rectangle frames, and polar frames.

A line frame 202 provides a frame 202 for a line shape object 200 that has a start point and an end point. The user can modify the start or end point and manipulate the start and end points of the line.

A rectangular frame 202 provides a frame for a shape object 200 that remains of constant scale, e.g., a chair that only comes in one size.

A scaling rectangle frame 202 provides a frame for a shape object 200 that expands and shrinks in size, e.g., a custom-built desktop should expand or shrink to fit a space exactly. However, a scaling rectangle frame 202 also encompasses frames that expand or shrink in increments, such as a cubicle wall, depending on what sizes are manufactured.

A polar frame 202 provides a frame for a shape object 200 that always expands or shrinks in both dimensions proportionally. Other types of frames are also possible with the present invention.

Entities Collection

The entities collection 204 stores a set of zero or more entities. An object 200 uses an entities collection 204 to define the geometry for rendering the object's 200 appearance. At least one entity 204 holds the geometry that makes up the object 200. The entities collection 204 is a standalone collection of objects to hold geometry for shapes and other objects. In addition, the entity 204 can hold other objects 200 to fully define the object 200. A complex object 200 may comprise several entities 204, each of which may store some geometry as well as particular related sub-objects 200.

Plugs and Sockets

The plugs 206 and sockets 208 enable geometric and logical connections between objects 200. Plugs 206 enable one side of the connection, and sockets 208 enable the other side. Plugs 206 and sockets 208 can be designed to accept any type of mating connectors, or specific types of connectors, much like electrical plugs and sockets 208 used in a home to distinguish between 110VAC and 220VAC connections. For example, a deluxe chair shape object 200 may contain sockets 208 that accept only deluxe plugs 206 to disallow mating less expensive seats, backs, and arms to the deluxe chair shape object 200.

Handles

The handles 210 are points located within the object 200 that are exposed to the user interface (UI) when the object 200 is selected. Handles 210 allow direct manipulation of geometry within the object 200, as well as any other object 200 parameter of collection element that can be referenced via expressions. Handles 210 have properties, such as x-y position, geometry, and define a relationship between mouse and handle position. With the handles 210 of the present invention, the shape author can constrain handles to particular range of motion as function of mouse movement. Typically, the handle 210 x and y coordinates are directly related to the mouse x and y coordinates. However, the handle 210 of the present invention allows the shape author to relate the handle x and y coordinates to any function, or a constant. For example, the shape author can equate the x coordinate of the handle 210 (handlex) to a constant, and the y coordinate of handle 210 (handley) to the y coordinate of mouse pointing device 112. This would create a handle 210 that moves only in the y direction regardless of the x position of the mouse pointing device 112. The shape author can use any expression, e.g., trigonometric functions, equations, or other functions to constrain handle properties. The handle 212 position is thus independent of mouse position, and the shape author relates the handle 212 position to the mouse pointing device 112 position by using an expression to achieve any desired handle 212 motion.

Properties

The properties 212 are other custom or extended properties defined by the object 209 author not contained within the frame 202, handles 210, plugs 206, and sockets 208. For example, custom properties 212 can be a manufacturer code (a string), a price (a currency value), a coefficient of friction for a given material, a floating point value, etc. Properties 212 can also be defined for intermediate or scratch values within an object 200.

Extended properties that are hidden may also be added and utilized by an object or shape author. For example, a hidden extended property may be added and contain a specific value that identifies that a particular shape or object is an instance of the author's authored shape or object. For example, UVW company may add a hidden extended property called Mastername with a value of "UVW Widget". The Mastername property may be used in solutions to take object specific action.

One or more embodiments of the invention provide a hidden read-only property or pointer called "protection". The protection property returns a protection object 220 of an object 200 or a shape.

One or more embodiments of the invention may also provide an expressions property that points to the object's 200 expressions object 222.

The Drag Handler

The object 200 may contain objects that handle messages and the behavior of the object 200. The object 200 may contain an object that, for example, handles the object's 200 drag and drop behavior. This object is known as the drag handler 214. The drag handler 214 can be customized or initially authored by a user, which enables a user to change the actions performed by the object 200 upon entering the program as well as the object's 200 interactions with other objects 200.

The Message Handler

The object 200 also contains an object that handles messages passed down from the containing system. This object is called the message handler 216. The message handler 216, like the drag handler 214, can be customized or initially authored by a user, which enables a user to change the actions performed by the object 200 in response to keyboard, mouse, and other system events.

Custom Commands

In addition to the above, each object 200 has custom commands 218 that can be programmed by the user. These custom commands 218 are accessed by the user by using a context menu, typically accessed by using the right hand button on a mouse pointing device 112. For example, the chair shape object 200 described above may have a custom command 218 associated with it to include a solid back on the shape object 200, or a carved back, or a padded seat, etc., depending on the desires of the user.

Protection Object

One or more embodiments of the invention provide the ability to access, manipulate, and use various aspects of an object 200 while preventing the modification and access to unauthorized object 200 aspects. In contrast, if visibility to an author's object 200 is completely hidden (to protect the expressions and properties of the object 200), the position of the object 200 (such as a shape object) cannot be modified (the position of a shape is in an object that the shape owns) and there can be no editing of a label of an object 200 or shape. Such abilities are enabled through a protection scheme that utilizes the hidden protection property of an object 200.

The hidden protection property returns or points to a protection object 220. A protection object 220 governs the protection of property values and property expressions for all properties (e.g., frame 202, entities 204, properties 212, etc.) of the object 200, as well as the properties of all the sub-objects of the object 200. A sub-object can be a shape object, geometry object (such as a. circle object or, rectangle object), other objects such as plugs 206, sockets 208, and handles 210, etc. Once the protection object 220 enables or turns on protection for an object 200, users are prevented from examining and modifying the values and expressions of the properties of the object 200.

Figure 3:
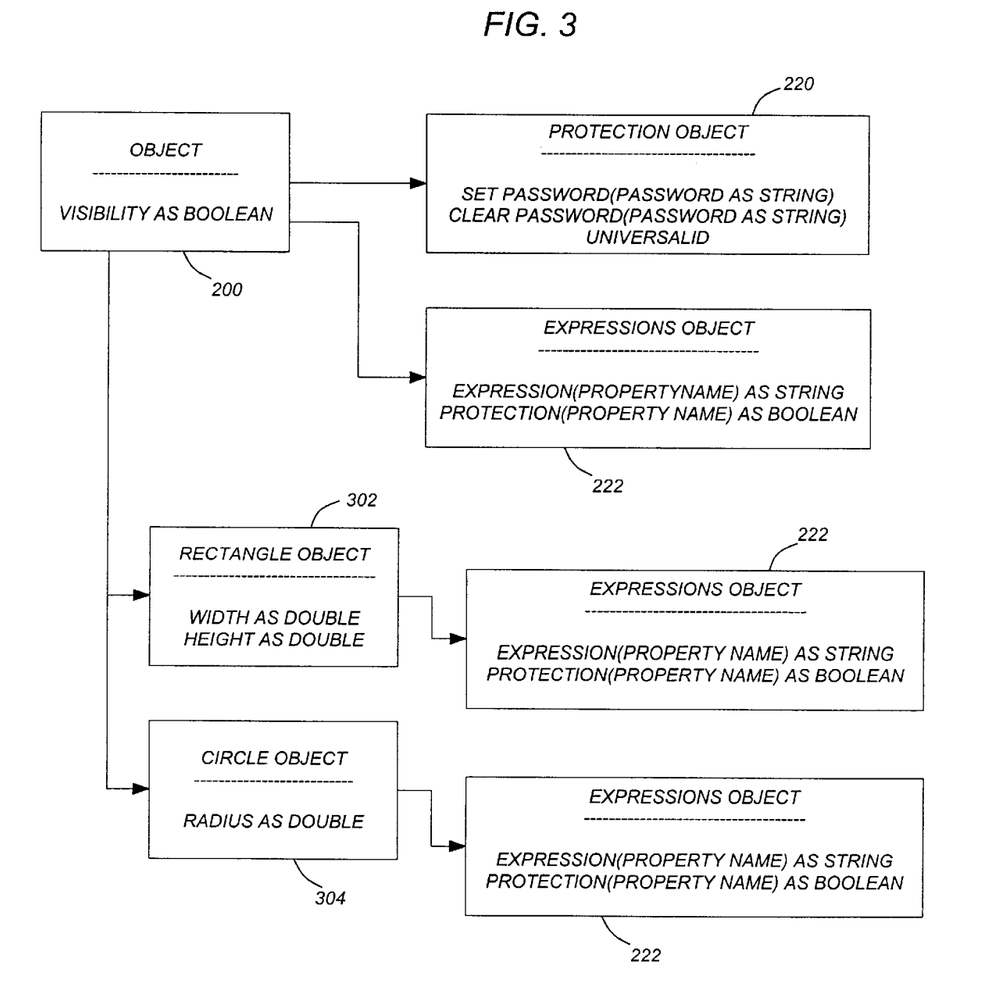
FIG. 3 illustrates an object, a protection object, and sub objects in accordance with one or more embodiments of the invention.

FIG. 3 illustrates an object 200, a protection object 220, and sub objects in accordance with one or more embodiments of the invention. As illustrated, object 200 has a protection object 220 and an expressions object 222. Further, protection object 220 governs the protection of property values and expressions for the rectangle sub-object 302 and circle sub-object 304.

A protection object 220 may have one or more of the following properties and/or methods:

(1) a parent property
(2) a universal identification property;
(3) a make universal identification method;
(4) a set password method;
(5) a clear password method; and
(6) a has password method.

The parent property is a read only property that identifies the object 200 that owns this object 200. The parent of an object 200 can be different for each type of object 200. For instance, the parent of a DrawObject is the owner of the collection that contains the object 200 while the parent of a Point2D object may be a curve or a path object. The parent property is used primarily by the expressions object 222 (see description below) as a standard means to identify objects 200 hierarchically above the current object 200.

The universal identification property (referred to as "UniversalID") is utilized to store a universal identification string. The universal identification property is a read-write property and is a string in the form:

{12345678-ABCD-EFGH-9876-1234567890AB}

Two objects 200 or shapes that have the same identification property, in a consistent form, can reliably be assumed to be instances of the same object 200 or shape. Alternatively, the identification property value may be empty or NULL, which may be the default value. A NULL value indicates that the object 200 does not have a unique string that identifies it.

Since the access permissions for the universal identification property is read-write (permitting the property to be both read and written by a user), a solution developer can recognize when a particular supplied generic object 200 is dropped (i.e., when the universal identification property is no longer available). Additionally, the read-write access permissions enable a solution developer to extend the definition of the corresponding object 200 with new intelligence (i.e., by writing additional information/intelligence to the object 200) and/or to replace the universal identification with one specific to a particular solution (i.e., by writing a new universal identification to identify a specific object 200 that is used in a particular drawing/situation).

A solution developer may also release a new version of an object 200. To release a new version, the object 200 may be directly edited. Alternatively, the user may start over and simply assign the same universal identification to the newly created object 200, thereby replacing the old object 200 version (with the same universal identification) with the new object 200 version.

The make universal identification method (referred to as "MakeUniversalID") initializes the identification property to a value that is universally unique using Microsoft's GUID (Globally Unique IDentifier) generator.

The password that is utilized to protect properties and expressions of an object 200 (or sub-objects 302–304) is determined using the set password and clear password methods (or expressions). Both the set password and clear password methods utilize a string containing the user-specified password as a parameter for the method. Set password can only be used if an object 200 has a non-NULL identification property. When the set password method is called, the password is not stored directly. Instead, the password is used together with the universal identification to create a sixteen (16) byte piece of data. The sixteen (16) byte data block is created and saved the first time the set password method is executed, and compared against whenever subsequent calls to set password or clear password are performed. Accordingly, to clear a password, the user must specify the existing password.

Once a password has been set using the set password method, the object 200 is said to be password protected. Accordingly, assigning a password to an object 200 protects the object 200 from being modified. It also protects the object's 200 protected values or expressions (see description below) from being viewed or modified. Once an object 200 has a password, a user cannot change the property protection for any of the object's 200 properties. In other words, a user cannot change the TRUE or FALSE value of an expressions object 222 protection property (see description below).

The clear password method clears the specified password from the parent object 200 of the protection property. Once a password is cleared, the object 200 is no longer protected from modification. A user can view the object 200 in an object editor and can explode the object 200 or shape. Additionally, property protection for the object's 200 properties can be changed. In other words, a user can change the TRUE or FALSE value of the expressions object 222 protection property (see description below).

Only properties and expressions of password protected objects 200 may be protected from unauthorized access. A "has password" method that returns a boolean result may also be utilized to determine if the object 200 is password protected.

Expressions Object

As described above, an object's 200 properties may be defined in terms of one or more expressions. An expression is a mathematic, comparison, or logic statement that defines property values in terms of constants, values, or other properties. An expression may consist of keywords, functions, operators, and variables. Further, an expression may store equations, expressed as strings, that specify what happens to an object 200 when an event occurs. Accordingly, an expression allows the user to assign to one property a value that results from the user's interaction with another property. This constant, real-time notification system provides document-wide intelligence to objects 200 and other application 118 features. Unlike a Visual Basic assignment, an expression maintains the relationship between two object 200 properties while the user is running the application 118. Only one expression for any particular read-write property may be set. Thus, any one property can have no more than one expression.

Expressions for an object's 200 properties are maintained in an expressions class/object 222. The expressions (and thereby the expressions object 222) of an object 200 contain the creative proprietary investment of the author.

The expressions object 222 may provide one or more of the following properties and methods:

(1) Protection property;
(2) Get expression method;
(3) Remove expression method; and
(4) Set expression method.

To protect the author's proprietary information and investment while still permitting the display and use of the object 200, the expressions object 222 of an object 200 may provide a boolean read-write "Protection" property. The protection property is a Flex read/write expression in the form "Protection(Variant property)=Boolean" wherein "Variant property" identifies the property that is to be protected and "Boolean" specifies whether the identified property is to be protected (TRUE) or not protected (FALSE). If the protection property has a value of TRUE, the value of the corresponding property cannot be changed, and the expression for the property cannot be read or modified (i.e., another expression cannot be assigned to the property, the expression cannot be removed from the property, and a user cannot read the expression assigned to a property).

If a user attempts to set or get the protection property (using the set or get expression methods) when the specified property is not a Flex read/write property (i.e., an expression), or if the property has a parent, grandparent, etc. that has a password, the set or get operation will fail. Accordingly, protection is only possible for properties that are managed by an expression object 222.

Figure 4:
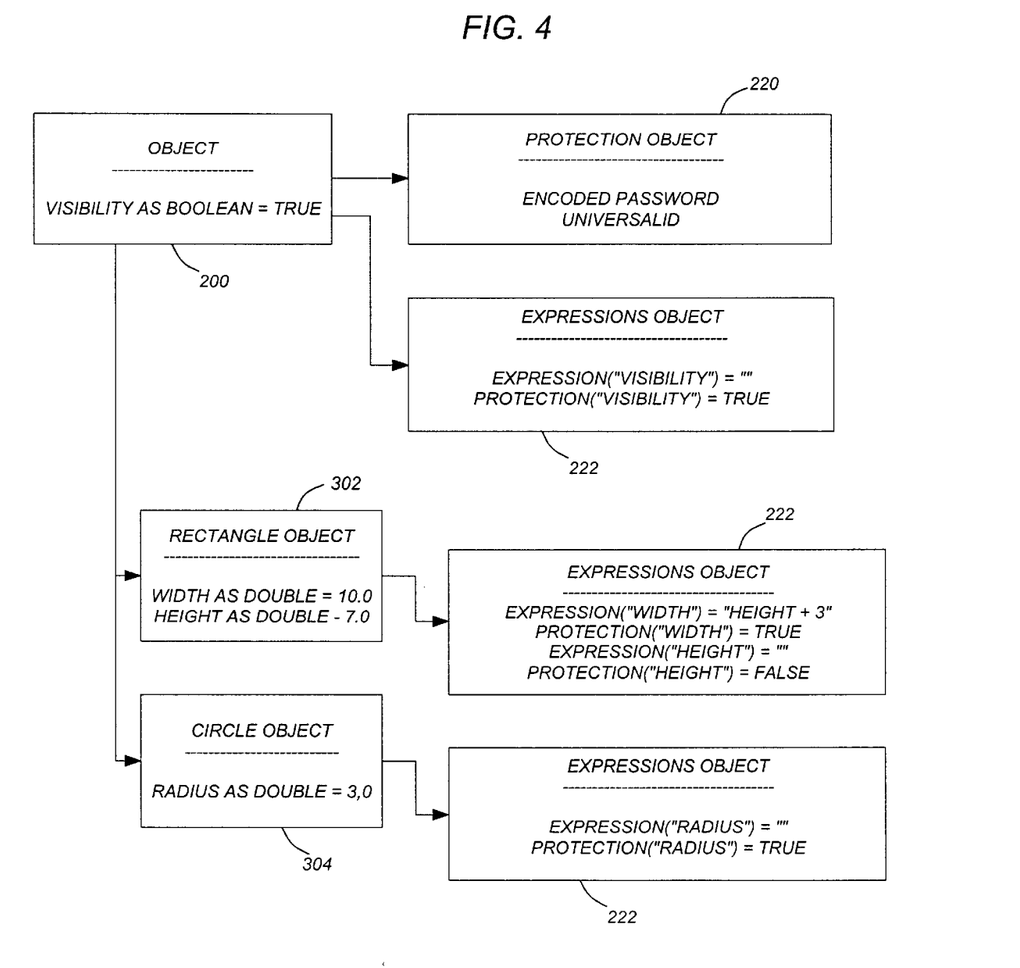
FIG. 4 illustrates an example of various objects that participate in the object protection scheme in accordance with one or more embodiments of the invention.

FIG. 4 illustrates an example of various objects 200 that participate in the object 200 protection scheme in accordance with one or more embodiments of the invention. In the example, protection object 220 indicates that the object 200 has an encoded password. Further, the visibility property identified in box 200 is a boolean variable set to TRUE. The expressions object 222 of object 200 indicates that the protection for the object's 200 visibility property is TRUE. Therefore, the application 118 prevents the end user from changing the value of the object's 200 visibility property. The application 118 also prevents the user from reading or modifying the expression (set in the expressions object 222 as " ") for the object's 200 visibility property.

The protection for the rectangle object's 302 width property (identified in the expressions object 222 for the rectangle object) is TRUE. Therefore, the application 118 prevents the end user from changing the value of the rectangle's 302 width property. The application 118 also prevents the user from reading or modifying the expression (set as "HEIGHT+3" in expressions object 222) for the rectangle's 302 width property.

The protection for the rectangle's 302 height property is FALSE. Accordingly, the user may change the value of the rectangle's 302 height property. The user may also assign an expression to the rectangle's 302 height property (set in expressions object 222 as " ").

The protection for the circle's 304 radius property is TRUE. Accordingly, the application 118 prevents the end user from changing the value of the circle's 304 radius property. The software also prevents the user from reading or modifying an expression for the circle's 304 radius property.

Thus, the ability to change the value of a property (and the ability to read and modify the expression on a property) is governed by the value of the protection property in an expressions object 222. In one or more embodiments, the value of the protection property cannot be changed if the object 200 has a password. In such embodiments, in order for the user to specify or change a protection property, the clear password method must be utilized first.

In another embodiment, the password may be supplied as an additional parameter into the protection property method (along with the property to be protected) such that only users that supply the appropriate password have the ability to change the value of the protection property. Further, if the object 200 is not password protected, then the password supplied as a parameter may be used to set the password for the object 200 (e.g., in a set password method for the object 200) and cause the object 200 to be password protected. In one or more further embodiments, expressions or properties of an object 200 may be protected by different passwords. Accordingly, the user may provide a password for a particular expression when setting the protection property for that expression. Thus, expressions and properties may be protected on an individual basis.

Creating an Object

Figure 5:
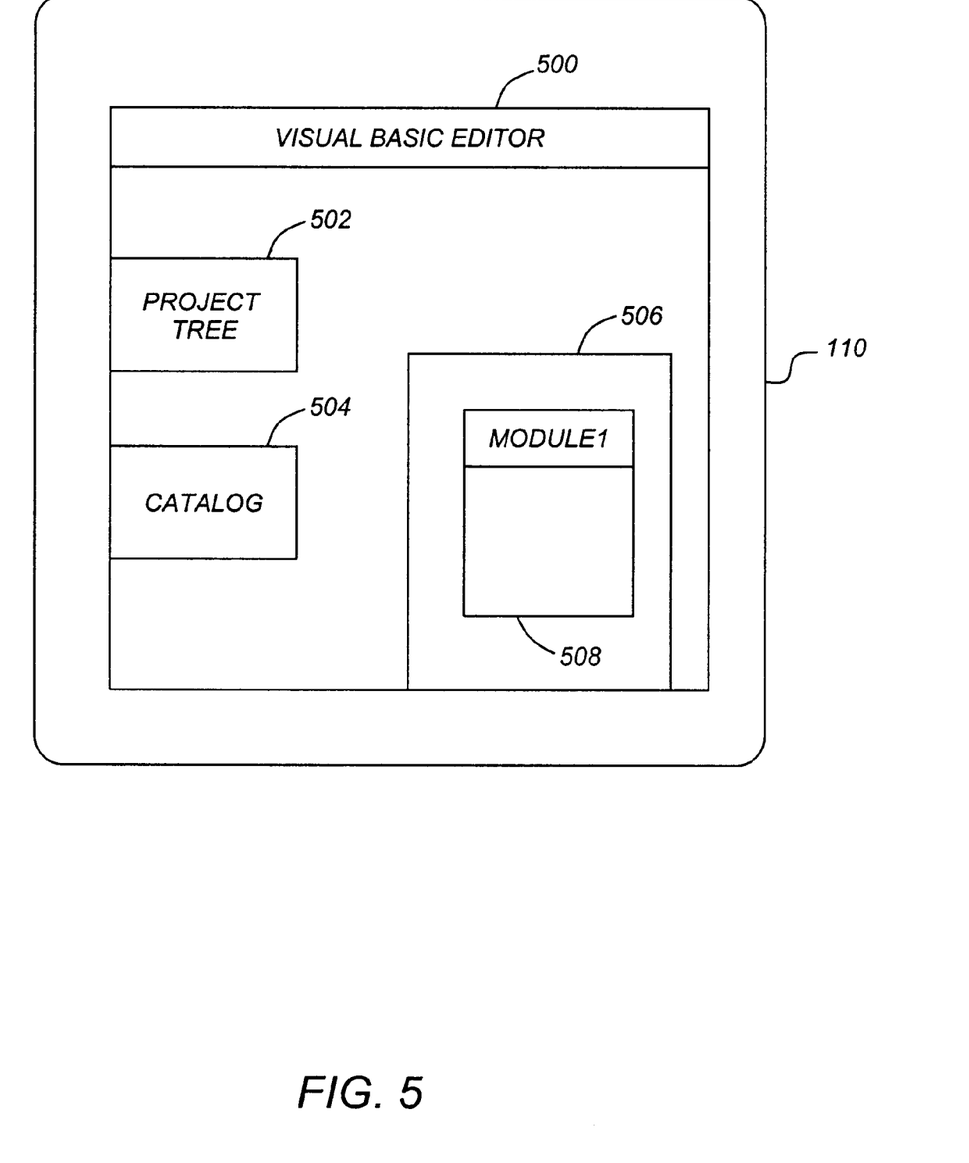
FIG. 5 illustrates how to create an object in accordance with one or more embodiments of the invention.

FIG. 5 illustrates the Visual Basic for Applications (VBA) editor window 500 where computer software code is written to define an object 200. The VBA editor window 500 contains other windows, such as the project tree window 502, the catalog window 504, and the working window 506. Once the editor function to create an object 200 has been invoked, module window 508 will appear in working window 506. Other methods for creating an object 200 are envisioned within the scope of the present invention.

The first step in creating an object 200 is to create the frame of the object 200. This frame comprises computer software code that performs several functions, e.g., mapping the spatial aspects of the object 200 to the document coordinate space (or any other space desired by the user), providing a framework to attach the other elements or objects associated with that object 200, relating the subordinate objects within the object 200 together, and characterizing the spatial aspects of the object 200 such that commands that are applied to the object can be correctly interpreted.

Although there are several methods to create a frame 202, or an object 200, initially, a user or designer selects a frame as a basis for the remainder of the object 200.

Once the frame is created, a property (or multiple properties) of the object 200 is created by the object 200 author. These properties include the entities collection 204, the plugs 206 and sockets 208, the handles 210, the custom properties 212, the drag handler 214, the message handler 216, and the custom commands 218. The user adds definition to these properties, either in the form of mathematical expressions or constants, to create the property itself.

Additional properties or subordinate objects can be added to the object 200 as needed or desired by the user. For example, the protection property for an expression may be added and defined.

The user then couples the property to the frame 202 to allow the frame to use the defined property, by adding lines of code to window 608 to add the circle to the entities collection 204, or by other means.

The property can then be modified to display the desired information, e.g., by returning to window 508 and changing the properties, such as the radius of the circle, etc.

The use of software code to create an object 200 is preferred to using a pointing device 112 because software code provides more precision to the object 200. Further, software allows a user to add more exotic properties to an object 200 (such as a shape), which would be difficult if not impossible to create using a pointing device 112.

Utilizing the Protection Scheme

Figure 6:
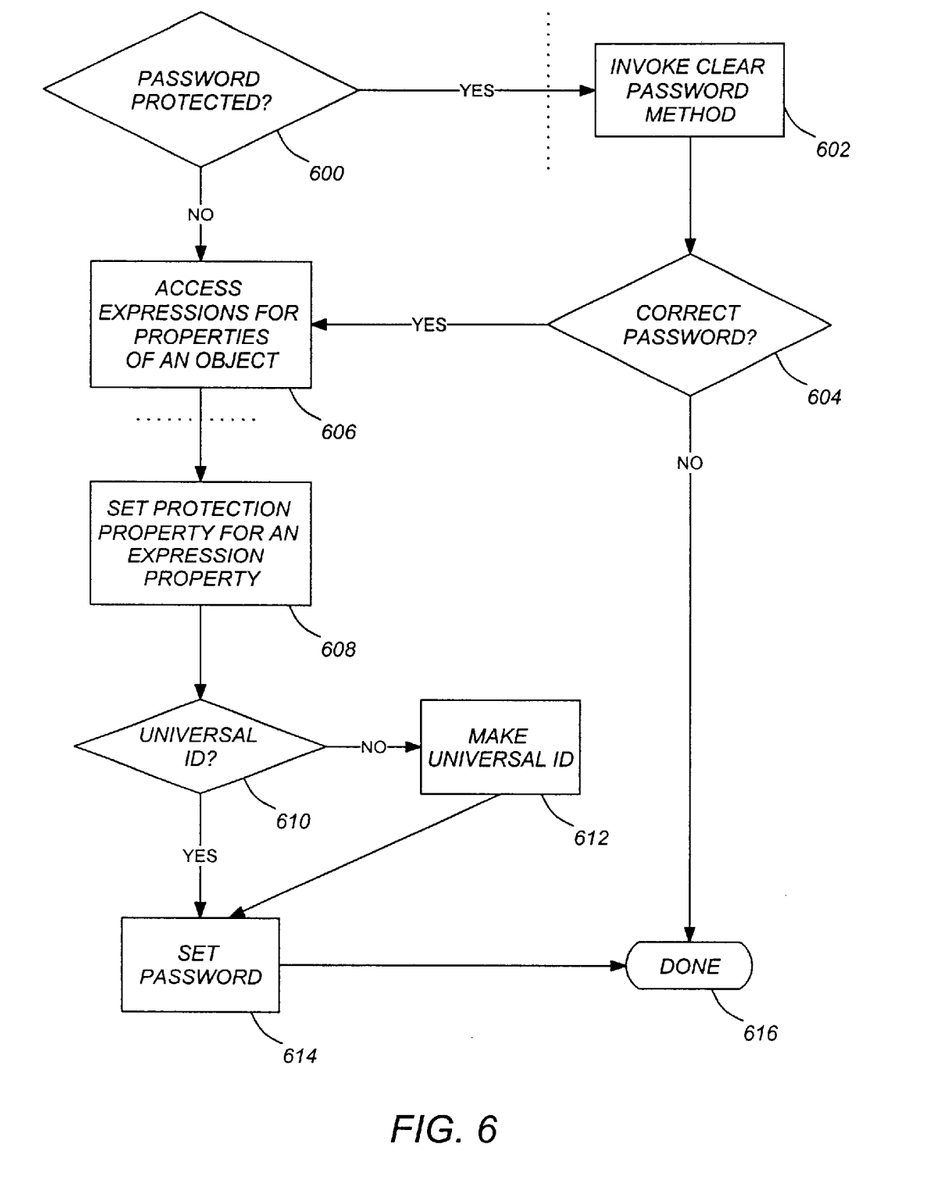
FIG. 6 is a flow chart illustrating the use of the protection scheme in accordance with one or more embodiments of the invention.

FIG. 6 is a flow chart illustrating the use of the protection scheme in accordance with one or more embodiments of the invention. The elements of FIG. 6 may be invoked when a user desires to protect various expressions of an object 200. Alternatively, various steps of FIG. 6 may be invoked when the user attempts to access, modify, etc. a property of an object 200. At step 600, the application 118 determines if the object 200 is password protected. If the object 200 is password protected, the user must invoke the clear password method at step 602. At step 604, a determination is made regarding whether the correct password was supplied to the clear password method. If not, the process is complete at step 616. Alternatively, the user does not invoke the clear password method, the process is complete at step 616 and the user is not permitted to access the requested information. If the password supplied was correct, the process continues at step 606.

At step 606, application 118 provides the ability to access the expressions for properties of an object 200. Such access may be read-write access such that the user can read or modify the expressions of an object 200.

The process continues at step 608 if the user is an author that wishes to protect elements of the object 200. At step 608, the protection property for a specified property (that is an expression) is set. Accordingly, to prevent access to a specified property, the protection property in the specified property's expression object 222 is set to TRUE.

At step 610, a determination is made regarding whether the object 200 has a universal identification. If not, a universal identification is created/made at step 612 by calling the MakeUniversalID method or by assigning a value directly to the UniversalID property.

At step 614, the set password method of the protection object 220 is utilized to assign a password to the object 200 thereby causing the object 200 to be password protected. As described above, once an object 200 has been password protected, a user cannot view the object 200 in an object editor or explode it. Additionally, the user cannot change the protection property for any of the properties/expressions. In other words, the user cannot change the TRUE or FALSE value of the expressions object 222 protection property. The process is complete at step 616.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having objects, shapes or properties of an object or shape could benefit from the present invention.

In summary, the present invention discloses a method, apparatus, and article of manufacture for protecting properties of an object or shape in a computer within an application program. The intelligent object comprises several objects for use in connecting, manipulating, displaying, mapping, and otherwise creating a new component or modifying an existing one. The intelligent object also comprises a protection object that is utilized to set a password that activates password protection for the object and expressions of the object. The individual object properties and expressions are governed by an expressions object that contains a protection property that can be set for each property or expression. By setting the protection property of an expression to TRUE, the expression cannot be read, changed, or deleted and a new expression cannot be assigned to the property. Thus, an author can designate specific properties of an object to be protected such that access is not permitted. Once the author designates the elected properties, the author assigns a password to the object thereby activating or causing the object to be password protected. Once activated, users are prevented from examining and modifying the values and expressions of the properties of the object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of preventing unauthorized access to a property of a shape object in a computer drawing program comprising:

assigning a value to a protection property for a property of a shape object, wherein the value signifies the intent to prevent access to the property;

assigning a password to the shape object thereby resulting in the shape object being password protected, wherein access to the property of a password protected shape object is not permitted.

2. The method of claim 1, wherein the protection property is a boolean property.

3. The method of claim 1, wherein assigning the password to the shape object comprises combining the password with a universal identification of the shape object.

4. The method of claim 1, wherein the protection property of the property is maintained in an expressions object of the property.

5. A method of preventing unauthorized access to a property of a shape object in a computer drawing program comprising:

(a) receiving a request for access to a property of a shape object, (b) rejecting the requested access when:
      (i) the property has a corresponding protection property that signifies the intent to present access to the property; and
      (ii) the shape object has been assigned a password thereby resulting in the shape object being password protected.

6. The method of claim 5 wherein the protection property is a boolean property.

7. The method of claim 5 wherein the shape object has been assigned the password by combining the password with a universal identification of the shape object.

8. The method of claim 5 wherein the protection property is maintained in an expressions object for the property.

9. The method of claim 5, wherein the requested access is a request to change a value of the property.

10. The method of claim 5, wherein the requested access is a request to assign a new expression to the property.

11. The method of claim 5, wherein the requested access is a request to remove an existing expression from the property.

12. The method of claim 5, wherein the requested access is a request to read an expression assigned to the property.

13. The method of claim 5, wherein a clear password method must be invoked to access the property of the password protected shape object.

14. A method of preventing unauthorized access to a property of a shape object in a computer drawing program comprising:

providing a protection property for a property of a shape object, wherein a value of the protection property signifies the intent to prevent access to the property; and providing a method that assigns a password to the shape object thereby resulting in the shape object being password protected, wherein access to the property of a password protected shape object is not permitted.

15. The method of claim 14, wherein the protection property is a boolean property.

16. The method of claim 14, wherein the method for assigning combines the password with a universal identification of the shape object.

17. The method of claim 14, wherein the protection property is a method of an expressions object for the property.

18. The method of claim 14 further comprising providing a method for clearing a password that must be invoked prior to accessing the property of the password protected shape object.

19. A computer-implemented system for preventing unauthorized access to a property of a shape object in a computer drawing program comprising:

(a) a computer;

(b) a computer drawing program executing on the computer, the computer drawing program comprising:
      (i) a protection property for a property of a shape object, wherein a value of the protection property signifies the intent to prevent access to the property;
      (ii) a method for assigning a password to the shape object thereby resulting in the shape object being password protected, wherein access to the property of a password protected shape object is not permitted.

20. The system of claim 19, wherein the protection property is a boolean property.

21. The system of claim 19, wherein the method for assigning the password to the shape object comprises combining the password with a universal identification of the shape object.

22. The system of claim 19, further comprising an expressions object configured to maintain the protection property of the property.

23. A computer-implemented system for preventing unauthorized access to a property of a shape object in a computer drawing program comprising:

(a) a computer;

(b) a computer drawing program executing on the computer, the computer drawing program comprising:
      (i) a shape object having a property;
      (ii) a protection property for the property;
      (iii) a method for receiving a request for access to the property of the shape object;
      (iv) a method for rejecting the requested access when:
         (1) a value of the protection property signifies the intent to prevent access to the property; and
         (2) the shape object has been assigned a password thereby resulting in the shape object being password protected.

24. The system of claim 23 wherein the protection property is a boolean property.

25. The system of claim 23 wherein the shape object has been assigned a password by combining the password with a universal identification of the shape object.

26. The system of claim 23 wherein the graphics program further comprises an expressions object for the property that maintains the protection property.

27. The system of claim 23, wherein the requested access is a request to change a value of the property.

28. The system of claim 23, wherein the requested access is a request to assign a new expression to the property.

29. The system of claim 23, wherein the requested access is a request to remove an existing expression from the property.

30. The system of claim 23, wherein the requested access is a request to read an expression assigned to the property.

31. The system of claim 23, wherein the computer program further comprises a clear password method that must be invoked to access the property of the password protected shape object.

32. An article of manufacture comprising a computer program carrier readable by a computer and embodying one or more instructions executable by the computer to perform a method for preventing unauthorized access to a property of a shape object in a computer drawing program, the method comprising:

assigning a value to a protection property for a property of a shape object, wherein the value signifies the intent to prevent access to the property;

assigning a password to the shape object thereby resulting in the shape object being password protected, wherein access to the property of a password protected shape object is not permitted.

33. The article of manufacture of claim 32, wherein the protection property is a boolean property.

34. The article of manufacture of claim 32, wherein assigning the password to the shape object comprises combining the password with a universal identification of the shape object.

35. The article of manufacture of claim 32, wherein the protection property of the property is maintained in an expressions object of the property.

36. An article of manufacture comprising a computer program carrier readable by a computer and embodying one or more instructions executable by the computer to perform a method for preventing unauthorized access to a property of a shape object in a computer drawing program, the method comprising:

(a) receiving a request for access to a property of a shape object, (b) rejecting the requested access when:

(i) the property has a corresponding protection property that signifies the intent to prevent access to the property; and (ii)) the shape object has been assigned a password thereby resulting in the shape object being password protected.

37. The article of manufacture of claim 36, wherein the protection property is a boolean property.

38. The article of manufacture of claim 36, wherein assigning the password to the shape object comprises combining the password with a universal identification of the shape object.

39. The article of manufacture of claim 36, wherein the protection property of the property is maintained in an expressions object of the property.

40. The article of manufacture of claim 36, wherein the requested access is a request to change a value of the property.

41. The article of manufacture of claim 36, wherein the requested access is a request to assign a new expression to the property.

42. The article of manufacture of claim 36, wherein the requested access is a request to remove an existing expression from the property.

43. The article of manufacture of claim 36, wherein the requested access is a request to read an expression assigned to the property.

44. The article of manufacture of claim 36 further comprising invoking a clear password method in order to access the property of the password protected shape object.

45. An article of manufacture comprising a computer program carrier readable by a computer and embodying one or more instructions executable by the computer to perform a method for preventing unauthorized access to a property of a shape object in a computer drawing program, the method comprising:

providing a protection property for a property of a shape object, wherein a value of the protection property signifies the intent to prevent access to the property; and providing a method that assigns a password to the shape object thereby resulting in the shape object being password protected, wherein access to the property of a password protected shape object is not permitted.

46. The article of manufacture of claim 45, wherein the protection property is a boolean property.

47. The article of manufacture of claim 45, wherein the method for assigning combines the password with a universal identification of the shape object.

48. The article of manufacture of claim 45, wherein the protection property is a method of an expressions object for the property.

49. The article of manufacture of claim 45, the method further comprising providing a method for clearing a password that must be invoked prior to accessing the property of the password protected shape object.

50. A data structure used to prevent unauthorized access to a property of a shape object, the data structure comprising:

a shape object that has a property, a value for a protection property of the property that signifies the intent to prevent access to the property, and a password assigned to the shape object that prevents access to the property.

51. The data structure of claim 50 wherein the value for the protection property is boolean.

52. The data structure of claim 50 wherein the password is a combination of a password and a universal identification of the shape object.

53. The data structure of claim 50 wherein the protection property of the property is maintained in an expressions object of the property.

* * * * *

UNITED STATES PATENT AND TRADEMARK OFFICE
CERTIFICATE OF CORRECTION

PATENT NO.   : 6,870,546 B1
DATED        : March 22, 2005
INVENTOR(S)  : David Wayne Arsenault et al.

It is certified that error appears in the above-identified patent and that said Letters Patent is hereby corrected as shown below:

Title page,
Item [63], Related U.S. Application Data, after "Nov. 29, 1999" insert -- now United States Patent No. 6,462,751, issued October 8, 2002 --; after "6,025,849" insert -- issued February 15, 2000 --; after "6,064,386" insert -- issued May 16, 2000 --; after "6,232,983" insert -- issued May 15, 2001 --; after "June 20, 2000" insert -- now United States Patent No. 6,219,056, issued April 17, 2001 --; after "6,064,386" insert -- issued May 16, 2000 --; after "6,232,983" insert -- issued May 15, 2001 --; after "Jan 20, 2000" insert -- now United States Patent No. 6,219,056, issued April 17, 2001 --; after "6,064,386" insert -- issued on May 16, 2000 --.

Item [56], References Cited, U.S. PATENT DOCUMENTS, delete "4,521,321 A *6/1985 Anderson et al. ...707/8".
OTHER PUBLICATIONS, insert:
-- Mark Edel, "The Tinkertoy Graphical Programming Environment", IEEE, p. 100 to 115, August 1998.
Townsend et al. QUE, "Microsoft Office 6-in-1 New Edition", p. 713, 1994 --.

Column 13,
Line 37, "present" should read -- prevent --.

Column 15,
Line 44, "(ii))" should read -- (ii) --.

Signed and Sealed this

Twenty-eighth Day of February, 2006

JON W. DUDAS
*Director of the United States Patent and Trademark Office*